(12) United States Patent
Lightcap

(10) Patent No.: US 6,241,616 B1
(45) Date of Patent: Jun. 5, 2001

(54) VARIABLE LENGTH DOUBLE TELESCOPING DRIVE SHAFT ASSEMBLY

(75) Inventor: Russell M. Lightcap, Pottstown, PA (US)

(73) Assignee: Neapco Inc., Pottstown, PA (US)

( * ) Notice: Subject to any disclaimer, the term of this patent is extended or adjusted under 35 U.S.C. 154(b) by 0 days.

(21) Appl. No.: 09/315,293

(22) Filed: May 20, 1999

(51) Int. Cl.⁷ ........................................ F16C 3/03
(52) U.S. Cl. ................ 464/162; 403/359.5; 464/179; 464/158
(58) Field of Search ............................ 464/150, 157, 464/158, 162, 179, 183, 106, 147, 149, 172, 901; 403/362, 377, 379.3, 359.1, 359.5, 27

(56) References Cited

U.S. PATENT DOCUMENTS

| | | | |
|---|---|---|---|
| 2,116,290 | * 5/1938 | Spicer | 464/162 |
| 2,695,504 | * 11/1954 | Magee | 464/162 |
| 3,293,884 | * 12/1966 | Grob | 464/162 |
| 4,125,000 | * 11/1978 | Grob | 403/359 |
| 4,136,982 | * 1/1979 | Sagady | 403/108 |
| 4,357,137 | * 11/1982 | Brown | 464/75 |
| 5,180,043 | * 1/1993 | Walker | 192/70.2 |
| 5,507,203 | * 4/1996 | Audibert et al. | 464/162 |
| 5,827,122 | 10/1998 | Kurian | 464/162 |
| 6,093,107 | * 7/2000 | Merlo et al. | 464/162 |

* cited by examiner

Primary Examiner—Lynne H. Browne
Assistant Examiner—Kenneth Thompson
(74) Attorney, Agent, or Firm—Woodcock Washburn Kurtz Mackiewicz & Norris

(57) ABSTRACT

A variable length double telescoping drive shaft assembly particularly suited for higher RPM applications (2,500 to 3,000 RPM). The assembly includes splined sliding members, namely a drive shaft and two elongated tubular members allowing for maximum telescoping with shorter minimum conditions. The assembly also includes a positive phasing and a non-pull apart features.

11 Claims, 3 Drawing Sheets

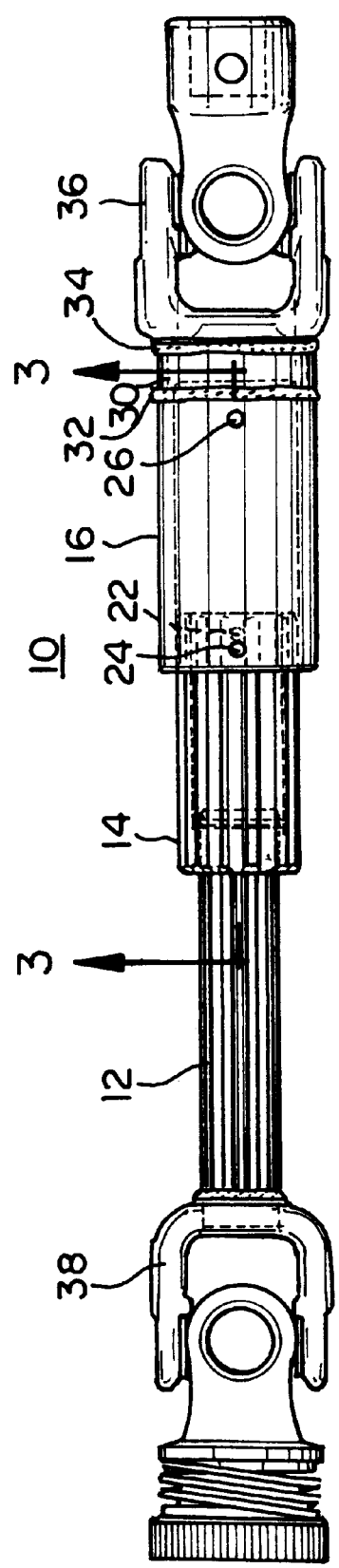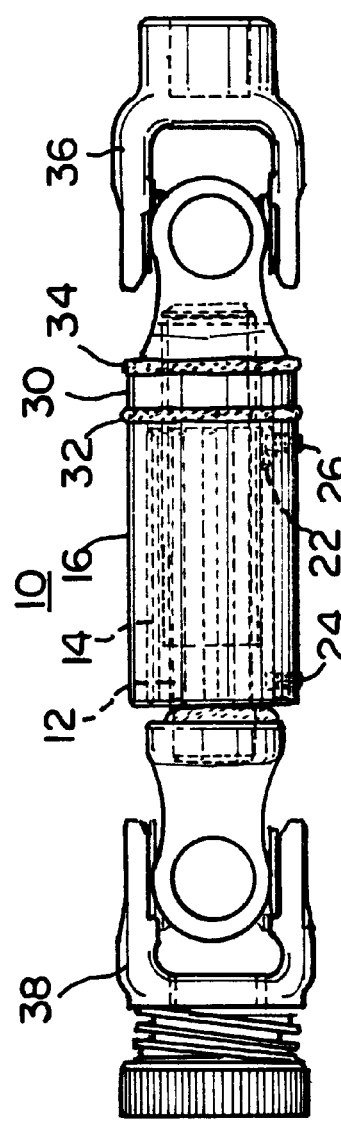

VARIABLE LENGTH DOUBLE TELESCOPING DRIVE SHAFT ASSEMBLY

BACKGROUND OF THE INVENTION

The present invention relates to drivelines of the type for connecting a driving member to a driven member. Such drivelines include a shaft which is slid into a sleeve ad allowed to slide axially with respect to one another. This motion is referred to as telescoping and allows the driveline to elongate and shorten while maintaining a fixed radial alignment. Such drivelines are frequently referred to as variable length telescoping drive shaft assemblies and are particularly suitable for driving agricultural machinery from a power source such as power take-off shaft of a farm tractor and the drive shaft of the agricultural machine driven thereby. It is necessary that the length of the assembly be variable and single telescoping drivelines are well known in the art. An example of a single telescoping driveline is disclosed in U.S. Pat. No. 5,827,122 assigned to the present assignee. Some applications, however, require that the driveline be able to extend to a greater length than attainable with a normal telescoping driveline. One example for a driveline of this type is for use on a tilt type mower deck. It is necessary that the deck be able to tilt up 90° from its normal operating position for cleaning. Under such conditions the driveline has to be able to extend to almost twice its normal length when running. When it is extended, there is no requirement in this example for the driveline to rotate or carry any torque but it must stay in phase and not pull apart. Other suitable applications may require that the driveline rotate, transmit torque, stay in phase, and not pull apart when extended.

SUMMARY OF THE INVENTION

The present invention is directed to a variable length double telescoping drive shaft assembly having a driven end and a driving end. The assembly includes an elongated drive shaft having a predetermined external cross-sectional configuration and a first elongated sleeve having a predetermined internal cross-sectional configuration complementary to the external configuration of the drive shaft. The first sleeve is dimensioned to slidably receive the drive shaft whereby the external configuration on the drive shaft meshes with the internal cross-sectional configuration of the first sleeve for rotation therewith. The first sleeve also has a predetermined external cross-sectional configuration. The assembly also includes a second elongated sleeve having a predetermined internal cross-sectional configuration complementary to the external configuration on the first sleeve and the second sleeve is dimensioned to slidably receive therein the first sleeve so that the external configuration on the first sleeve meshes with the internal configuration on the second sleeve for rotation therewith. Stop means are provided for preventing the shaft and the sleeves from pulling apart during the telescoping action.

In one form of the invention the elongated drive shaft has an externally splined cross-sectional configuration having a plurality of teeth and the first elongated sleeve has an internally splined cross-sectional configuration having a plurality of teeth, the first sleeve being dimensioned to slidably receive the drive shaft whereby the teeth on the drive shaft mesh with the teeth on the internally splined cross-sectional configuration of the first sleeve. The first sleeve has an externally splined cross-sectional configuration having a plurality of teeth and a second elongated sleeve is provided with an internally splined cross-sectional configuration having a plurality of teeth. The second sleeve is dimensioned to slidably receive therein the first sleeve so that the teeth on the externally splined first sleeve mesh with the teeth on the internally splined second sleeve and stop means are provided for preventing the shaft and the sleeves from pulling apart during telescoping action.

In one form of the invention the shaft has an outer end and an inner end and the inner end is provided with a groove for receiving a snap ring. The internal spline of the first sleeve is undercut from the inner end thereof throughout a predetermined length to form a shoulder adjacent the outer end of the first sleeve. The stop means includes a snap ring positioned within the groove of the shaft for engaging the shoulder on the internal spline of the first sleeve to prevent the shaft from pulling out of the first sleeve and for engaging the internal spline on the first sleeve during telescoping.

Further in accordance with the invention the spline of the shaft is provided with locating structure and the internal spline of the first sleeve is provided with a missing tooth for receiving the locating structure on the spline of the shaft to determine the phase alignment of the shaft with the first sleeve.

In one form of the invention the stop means includes a tack weld between adjacent teeth at the inner end of the first sleeve, a missing tooth area is provided on the internal spline of the second sleeve for receiving the tack weld on the first sleeve and a pail of set screws extend through the exterior of the second sleeve into the missing tooth area into the internal spline, one set screw being positioned adjacent the outer end of the second sleeve and the other set screw being positioned adjacent the inner end of the second sleeve for engaging the tack weld on the first sleeve to capture the tack weld therebetween and thus limit the telescoping movement of the first sleeve within the second sleeve.

For a more detailed disclosure of the invention and for further objects and advantages thereof, reference is to be had to the following description taken in conjunction with the accompanying drawings.

BRIEF DESCRIPTION OF THE DRAWINGS

FIG. 1 is a side elevation of a variable length double telescoping drive shaft assembly in extended position according to the present invention.

FIG. 2 is a side elevation showing the variable length double telescoping drive shaft assembly of FIG. 1 in collapsed position.

PREFERRED EMBODIMENT OF THE INVENTION

Figure 3:
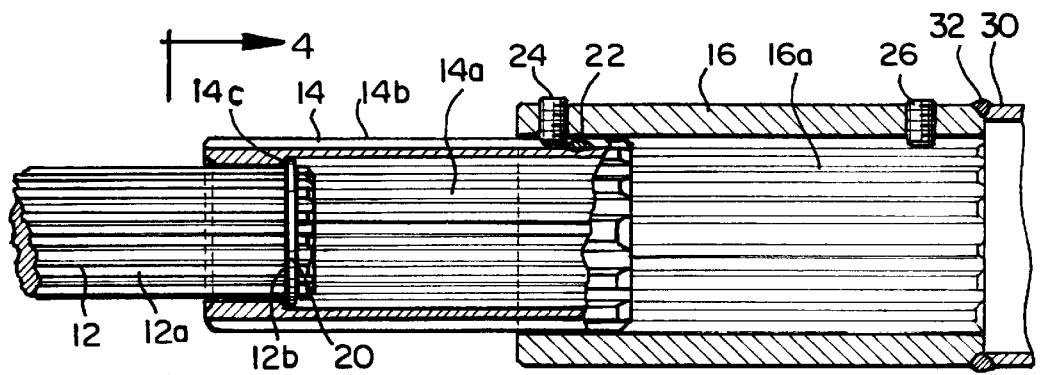
FIG. 3 is a sectional view taken along the lines 3—3 in FIG. 1.
Figure 4:
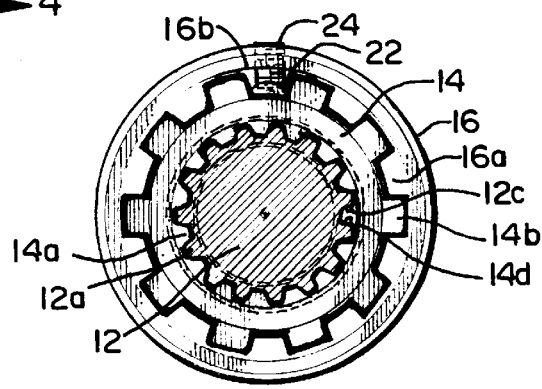
FIG. 4 is a cut sectional view taken along the lines 4—4 in FIG. 3.

Referring to FIG. 1 there is shown a variable length double telescoping drive shaft assembly 10 having a driven end and a driving end embodying the present invention. The assembly 10 includes an elongated drive shaft 12 having a predetermined external cross-sectional configuration, a first or inner elongated sleeve 14 having a predetermined internal cross-sectional configuration and an external cross-sectional configuration and a second or outer elongated sleeve 16 having a predetermined internal cross-sectional configuration. In the embodiment illustrated in the drawings the cross-sectional configurations are splined cross-sectional configurations each having a plurality of teeth. As may be seen in FIGS. 1, 3 and 4 the elongated drive shaft 12 is externally splined and has a plurality of teeth 12a. The first or inner elongated sleeve 14 has an internally splined cross-sectional configuration having a plurality of teeth 14a. The inner sleeve 14 is dimensioned to slidably receive the drive shaft 12 (i.e. shaft 12 slides within sleeve 14) whereby the teeth 12a on the drive shaft mesh with the teeth 14a on the internally splined cross-sectional configuration of the sleeve 14. The first or inner sleeve 14 has an externally splined configuration having a plurality of teeth 14b. The second or outer elongated sleeve 16 has an internally splined cross-sectional configuration having a plurality of teeth 16a. The second sleeve 16 is dimensioned to slidably receive therein the first sleeve 14 (i.e. sleeve 14 slides within sleeve 16) so that the teeth 14b on the externally splined first sleeve mesh with the teeth 16a on the internally splined second sleeve 16. This is best seen in FIG. 4.

Provision is also made for preventing the shaft 12 and the sleeves 14 and 16 from pulling apart during telescoping action. As may be seen in FIG. 5 the shaft 12 is provided with a groove 12b adjacent the outer end thereof for receiving a snap ring 20, FIG. 3. The internal spline of the inner sleeve 14 is undercut from the inner end thereof throughout a predetermined length to form a shoulder 14c adjacent the outer end of the sleeve 14. This is best seen in FIG. 3. As may be seen in FIG. 3 the snap ring 20 is positioned within the groove 12b for engaging the shoulder 14c on the internal spline of the sleeve 14. The snap ring 20 prevents the shaft 12 from pulling out of the inner sleeve 14 and also engages the internal spline of the sleeve 14 during telescoping.

Figure 5:
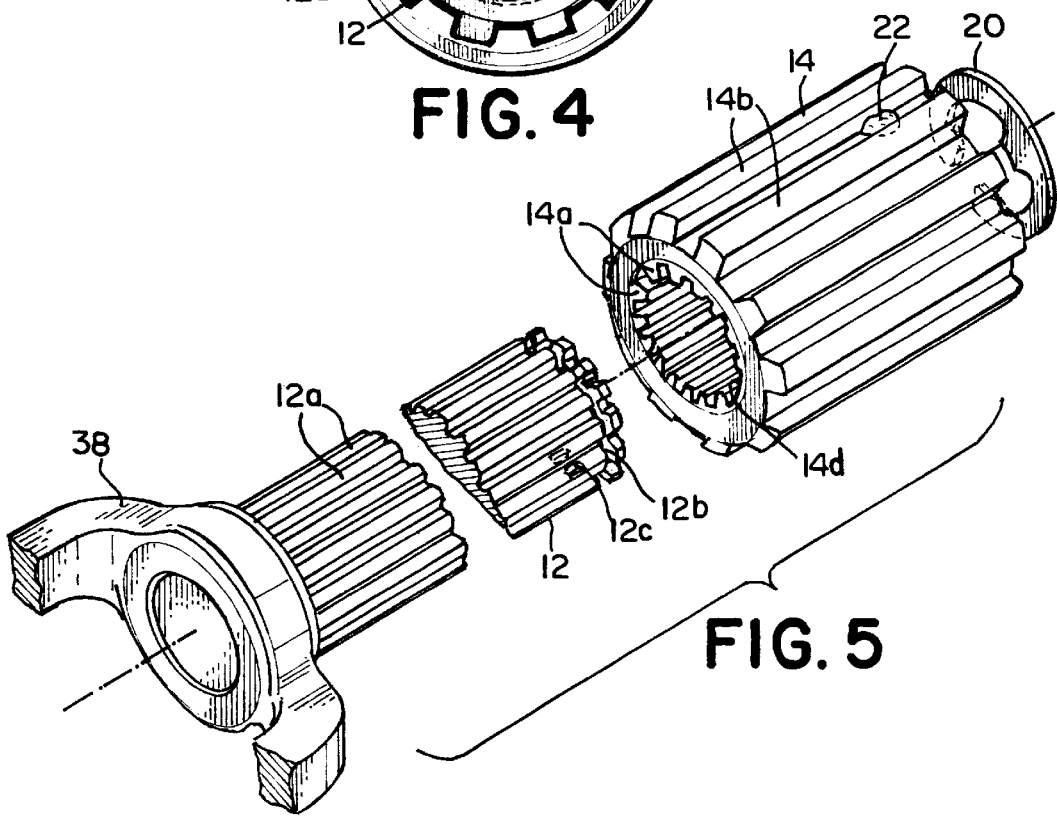
FIG. 5 is a partial exploded view of the drive shaft and first sleeve.

In order to determine the phase alignment of the drive shaft 12 with the inner sleeve 14, the spline of the shaft 12 is provided with locating structure 12c, FIG. 5. The locating structure 12c may take various forms but a preferred form is to stake two of the shaft teeth at the inner end of the shaft 12 as indicated at 12c in FIG. 5. The inner sleeve 14 is provided with a missing tooth area or slot 14d for receiving the locating structure 12c on the spline of the shaft 12. Thus the shaft 12 can only be inserted in one position into the sleeve 14, namely, when the locating structure 12c on the spline 12 is aligned with the slot 14d in the interior spline of the inner sleeve 14.

Figure 6:
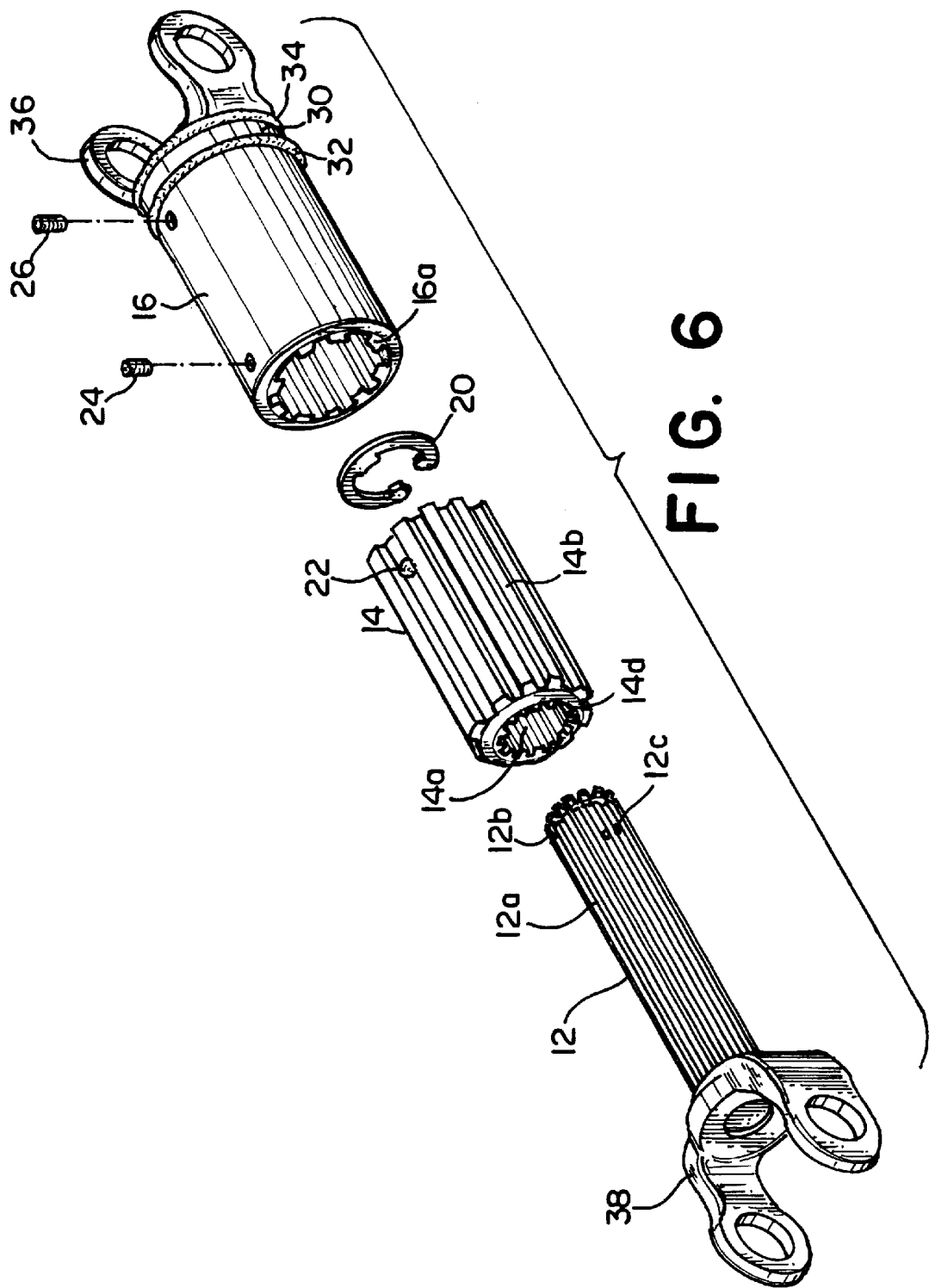
FIG. 6 is a complete exploded view of the variable length double telescoping drive shaft assembly of FIG. 1.

Referring to FIG. 3 it will be seen that a stop in the form of a tack weld 22 has been positioned between adjacent external teeth 14b at the inner end of the first sleeve 14. The inner and outer ends of the outer sleeve 16 have been provided with set screws 24 and 26 extending through the exterior of the sleeve 16. A missing tooth area 16b, FIGS. 4 and 6, is provided on the internal spline of the outer sleeve 16 for receiving the tack weld 22 on the first sleeve 14. The set screws 24 and 26 extend through the exterior of the outer sleeve 16 into the missing tooth area 16b. It will be noted that one of the set screws 26 is positioned adjacent the outer end of the outer sleeve 16 and the other set screw 24 is positioned adjacent the inner end of the sleeve 16 for engaging the tack weld 22 on the first sleeve 14 so as to capture the weld projection 22 therebetween and thus limit the telescopic movement of the first sleeve 14 within the second sleeve 16.

Depending upon the particular application involved, the variable length double telescoping drive shaft assemblies may require different lengths. To accommodate this, the outer end of the outer sleeve 16 is provided with a tubular extension 30 which may vary in length. One end of the tubular extension 30 is welded at 32 to the outer end of the elongated sleeve 16 and the outer end of the tubular extending 30 is welded at 34 to a universal joint 36. As shown in FIGS. 1 and 2 the outer end of the drive shaft 12 is adapted for connection to a universal joint 38. The assembly 10 disclosed herein is particularly suited for higher RPM applications (2500 to 3000 RPM).

While there has been described a preferred embodiment of the invention, it will be understood that further modifications may be made without departing from the spirit and scope of the invention as set forth in the appended claims. For example, while the configurations of the shaft and the internal and external configurations on the sleeves have been illustrated as splined having a plurality of teeth, it is to be understood that other configurations may be used such for example as the square configuration disclosed in the aforesaid U.S. Pat. No. 5,827,122, the disclosure of which is incorporated herein by this reference thereto.

What is claimed is:

1. A variable length double telescoping drive shaft assembly having a driven end and a driving end comprising an elongated drive shaft having an externally splined cross-sectional configuration having a plurality of teeth, a first elongated sleeve having an internally splined cross-sectional configuration having a plurality of teeth, said first sleeve being dimensioned to slidably receive said drive shaft whereby the teeth on the drive shaft mesh with the teeth on the internally splined cross-sectional configuration of said first sleeve, said first sleeve having an externally splined cross-sectional configuration having a plurality of teeth, a second elongated sleeve having an internally splined cross-sectional configuration having a plurality of teeth, said second sleeve being dimensioned to slidably receive therein the first sleeve so that the teeth on the externally splined first sleeve mesh with the teeth on the internally splined second sleeve, and stop means for preventing said shaft and said sleeves from pulling apart during telescoping action wherein said shaft has an outer end and an inner end, said inner end being provided with a groove for receiving a snap ring, said first sleeve having an inner end and an outer end, said internal spline of said first sleeve being undercut from said inner end throughout a predetermined length to form a shoulder adjacent the outer end of said first sleeve, and said stop means includes a snap ring positioned within said groove of said shaft for engaging the shoulder on said internal spline of said first sleeve to prevent said shaft from pulling out of said first sleeve and for engaging said internal spline of said first sleeve during telescoping.

2. A variable length double telescoping drive shaft assembly according to claim 1 wherein said spline of said shaft is provided with locating structure, and said internal spline of said first sleeve is provided with a missing tooth area for receiving said locating structure on the spline of said shaft to determine the phrase alignment of said shaft with said first sleeve.

3. A variable length double telescoping drive shaft assembly according to claim 1 wherein said stop means includes a tack weld between adjacent teeth at the inner end of said first sleeve, said outer sleeve having an outer end and an inner end, a missing tooth area on the internal spline of said second sleeve for receiving said tack weld on said first sleeve, and a pair of set screws extending through the exterior of said second sleeve into said missing tooth area in said internal spline, one set screw being positioned adjacent the outer end of said second sleeve and the other set screw being positioned adjacent the inner end of said second sleeve for engaging said tack weld on said first sleeve to limit the telescopic movement of said first sleeve within said second sleeve.

4. A variable length double telescoping drive shaft assembly according to claim 3 including a tubular extension fixed to the outer end of said second sleeve and a universal joint connected to said tubular extension.

5. A variable length double telescoping shaft assembly according to claim 4 including a universal joint connected to the outer end of said shaft.

6. A variable length double telescoping drive shaft assembly having a driven end and a driving end comprising an elongated drive shaft having a predetermined external cross-sectional configuration, a first elongated sleeve having a predetermined internal cross-sectional configuration complementary to the external configuration of said drive shaft whereby the external configuration on the drive shaft meshes with the internal cross-sectional configuration of said first sleeve for rotation therewith, said first sleeve having a predetermined external cross-sectional configuration complementary to the external configuration of said first sleeve, said second sleeve being dimensioned to slidably receive therein the first sleeve so that the external configuration on said first sleeve meshes with the internal configuration on said second sleeve for rotation therewith, and stop means for preventing said shaft and said sleeves from pulling apart during telescoping action, and wherein said shaft has an outer end and an inner end, said inner end being provided with a groove for receiving a snap ring, said first sleeve having an inner end and an outer end, said internal configuration of said first sleeve being undercut from said inner end throughout a predetermined length to form a shoulder adjacent the outer end of said first sleeve, and said stop means includes a snap ring positioned within said groove of said shaft for engaging the shoulder on said internal configuration of said first sleeve to prevent said shaft from pulling out of said first sleeve and for engaging said internal configuration of said first sleeve during telescoping.

7. A variable length double telescoping drive shaft assembly according to claim 5 wherein each of said cross-sectional configurations is a splined cross-sectional configuration having a plurality of teeth.

8. A variable length double telescoping drive shaft assembly according to claim 7 wherein said external configuration of said shaft is provided with locating structure, and said internal configuration of said first sleeve is provided with a slot for receiving said locating structure on said shaft to determine the phrase alignment of said shaft with said first sleeve.

9. A variable length double telescoping drive shaft assembly according to claim 8 wherein said stop means includes a projection at the inner end of said first sleeve, said outer sleeve having an outer end and an inner end, a groove on the internal configuration of said second sleeve for receiving said projection on said first sleeve, and a pair of set screws extending through the exterior of said second sleeve into said groove, one set screw being positioned adjacent the inner end of said second sleeve for engaging said projection on said first sleeve to limit the telescopic movement of said first sleeve within said second sleeve.

10. A variable length double telescoping drive shaft assembly according to claim 9 including a tubular extension fixed to the outer end of said second sleeve and a universal joint connected to said tubular extension.

11. A variable length double telescoping shaft according to claim 10 including a universal joint connected to the outer end of said shaft.

* * * * *